United States Patent
Chung et al.

(10) Patent No.: US 10,679,032 B2
(45) Date of Patent: Jun. 9, 2020

(54) FINGERPRINT SENSING METHOD AND FINGERPRINT SENSING DEVICE

(71) Applicant: NOVATEK Microelectronics Corp., Hsin-Chu (TW)

(72) Inventors: Jung-Chen Chung, Hsinchu County (TW); Chi-Ting Chen, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 99 days.

(21) Appl. No.: 16/105,977

(22) Filed: Aug. 21, 2018

(65) Prior Publication Data

US 2020/0065544 A1 Feb. 27, 2020

(51) Int. Cl.
*G06K 9/00* (2006.01)

(52) U.S. Cl.
CPC ....... *G06K 9/0004* (2013.01); *G06K 9/00523* (2013.01)

(58) Field of Classification Search
CPC .......... G06K 9/0004; G06K 9/00523
See application file for complete search history.

(56) References Cited

U.S. PATENT DOCUMENTS

| | | | |
|---|---|---|---|
| 2015/0346253 A1* | 12/2015 | Wang | G06K 9/00073 324/662 |
| 2017/0193262 A1* | 7/2017 | Lo | G01R 27/2605 |
| 2019/0325184 A1* | 10/2019 | Yan | G06K 9/0002 |

\* cited by examiner

*Primary Examiner* — John B Strege
(74) *Attorney, Agent, or Firm* — Winston Hsu

(57) ABSTRACT

A fingerprint sensing method and a fingerprint sensing device are provided. The fingerprint sensing method includes the following steps. A first supply voltage is provided to power a fingerprint sensing circuit of the fingerprint sensing circuit. When the fingerprint sensing circuit is powered by the first supply voltage, it is detected whether a finger touch occurs. In response to determining that the finger touch has occurred, a second supply voltage is provided to power the fingerprint sensing device. A fingerprint image sensing is performed to obtain a fingerprint image when the fingerprint sensing circuit is powered by the second supply voltage.

18 Claims, 9 Drawing Sheets

FINGERPRINT SENSING METHOD AND FINGERPRINT SENSING DEVICE

BACKGROUND OF THE INVENTION

1. Field of the Invention

The present invention relates to a finger sensing method and a fingerprint sensing device, and more particularly, to a finger sensing method and a fingerprint sensing device capable of providing various supply voltage to power a fingerprint sensing circuit for fingerprint sensing.

2. Description of the Prior Art

Fingerprint sensing technology is widely applied in a variety of portable electronic products, such as mobile phones, laptops, and tablets, for realizing identity recognition. Fingerprint sensing allows a user to perform identity recognition conveniently. For example, the fingerprint sensing device captures a fingerprint image when a user's finger touches the fingerprint sensing device. Thus, the user only needs to put his/her finger on a fingerprint sensing device of the electronic device to login the electronic device instead of entering long and tedious username and password.

SUMMARY OF THE INVENTION

The invention provides a method and a fingerprint sensing device, capable of providing various supply voltage to power a fingerprint sensing circuit for fingerprint sensing.

According to an embodiment of the present invention, a fingerprint sensing method for a fingerprint sensing device is provided. The fingerprint sensing method includes at least the following steps. A first supply voltage is provided to power a fingerprint sensing circuit of the fingerprint sensing circuit. When the fingerprint sensing circuit is powered by the first supply voltage, it is detected whether a finger touch occurs. In response to determining that the finger touch has occurred, a second supply voltage is provided to power the fingerprint sensing device. A fingerprint image sensing is performed to obtain a fingerprint image when the fingerprint sensing circuit is powered by the second supply voltage.

According to an embodiment of the present invention, a fingerprint sensing device is provided. The fingerprint sensing device includes a first voltage conversion circuit, a second voltage conversion circuit, a fingerprint sensing circuit and a finger touch detection circuit. The first voltage conversion circuit generates a first supply voltage. The second voltage conversion circuit generates a second supply voltage. The finger touch detection circuit is coupled to the fingerprint sensing circuit for determining whether a finger touch occurs according to sensing values measured by the fingerprint sensing circuit powered by the first supply voltage. When the finger touch detection circuit determines that the finger touch occurs, the second voltage conversion circuit generates the second supply voltage to power the fingerprint sensing circuit and the fingerprint sensing circuit performs fingerprint image sensing to obtain a fingerprint image.

To sum up, embodiments of the present invention provides the first supply voltage to power the fingerprint sensing circuit in the low modulating voltage mode and provides the second supply voltage having larger modulating voltage variation than the first supply voltage to power the fingerprint sensing circuit in the high modulating voltage mode for fingerprint image sensing, thus enhancing system performance and reducing power consumption.

In order to make the aforementioned and other features and advantages of the invention more comprehensible, several embodiments accompanied with figures are described in detail below.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
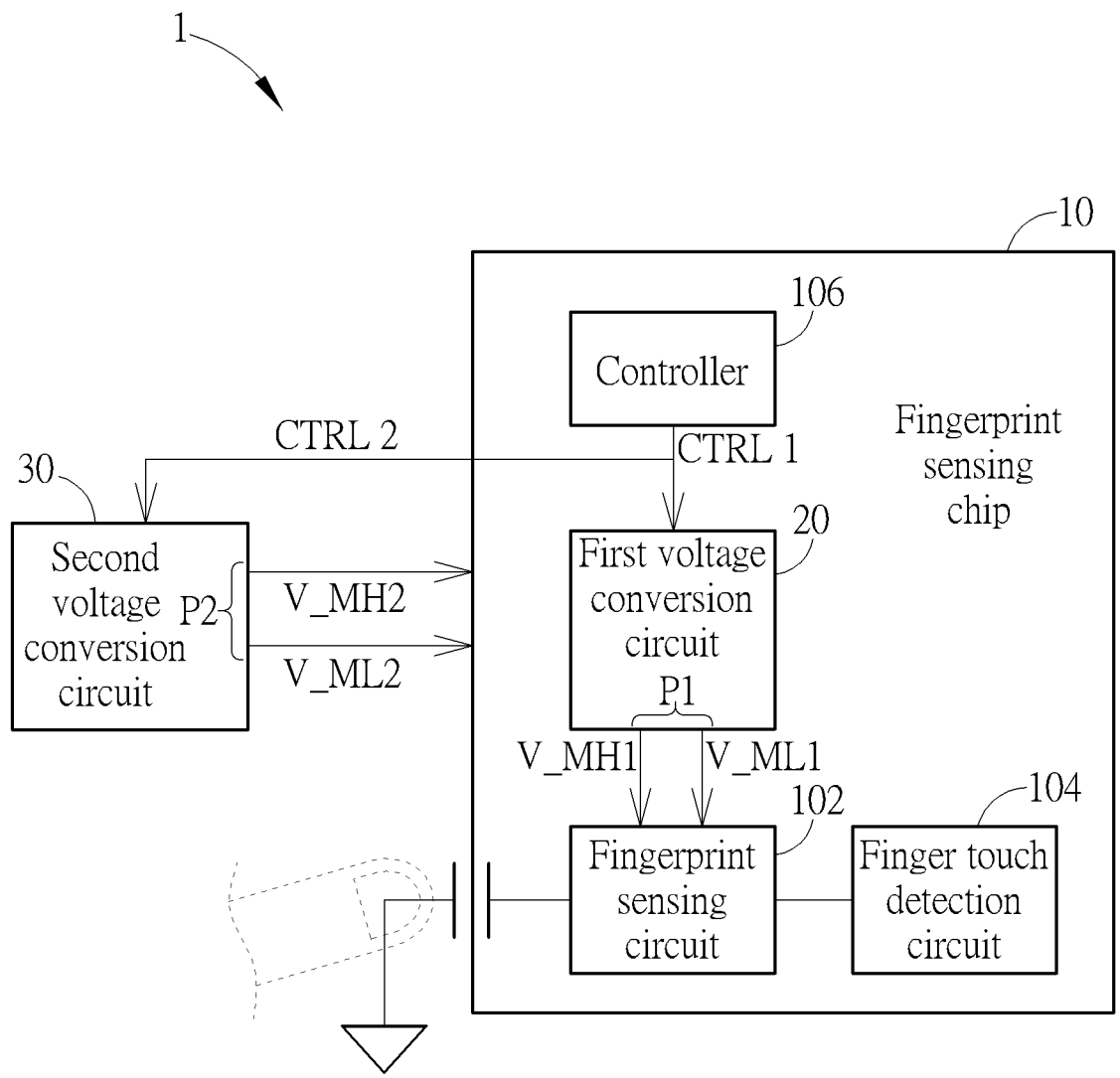
FIG. 1 is a schematic diagram of a fingerprint sensing device according to an embodiment of the present invention.

Please refer to FIG. 1, which is a schematic diagram of a fingerprint sensing device 1 according to an embodiment of the present invention. The fingerprint sensing device 1 includes a fingerprint sensing chip 10, a first voltage conversion circuit 20 and a second voltage conversion circuit 30. The first voltage conversion circuit 20 converts a first input voltage into a supply voltage P1. The second voltage conversion circuit 30 converts a second input voltage into a supply voltage P2. The first voltage conversion circuit 20 and the second voltage conversion circuit 30 may be charge pumps, buck converters, boost converters, or buck-boost converters, and this should not a limitation of the present invention. In an embodiment shown in FIG. 1, the first voltage conversion circuit 20 can be installed in the fingerprint sensing chip 10. The first voltage conversion circuit 20 may be a charge pump installed in the fingerprint sensing chip 10. The second voltage conversion circuit 30 may be a boost converter outside the fingerprint sensing chip 10. In another embodiment, the first voltage conversion circuit 20 may be installed outside the fingerprint sensing chip 10. The first voltage conversion circuit 20 and the second voltage conversion circuit 30 may be external voltage conversion circuits outside the fingerprint sensing chip 10.

The fingerprint sensing chip 10 includes a fingerprint sensing circuit 102, a finger touch detection circuit 104 and a controller 106. The fingerprint sensing circuit 102 may include a sensor array and a readout circuit. The fingerprint sensing circuit 102 measures sensing values of the sensor array. The finger touch detection circuit 104 is coupled to the fingerprint sensing circuit 102 for detecting whether a finger touch occurs on the fingerprint sensing circuit 102. The finger touch detection circuit 104 can receive sensing values measured by the fingerprint sensing circuit 102 and determine whether a finger touch occurs on the fingerprint sensing circuit 102 according to the sensing values.

In an example of the sensor array being a capacitive sensor array, a user's finger touch may alter the capacitance sensed by the sensor array. The fingerprint sensing circuit 102 performs the sensing process and measures a fingerprint capacitance sensed by the sensor array when powered by the first voltage conversion circuit 20. The finger touch detection circuit 104 may determine whether a finger touch occurs according to the finger capacitance measured by the fingerprint sensing circuit 102. In response to determining that the finger touch has occurred on the sensor array by the finger touch detection circuit 104, the fingerprint sensing circuit 102 performs the sensing operation (a fingerprint image sensing process) to obtain a fingerprint image when powered by the second voltage conversion circuit 30.

Figure 2:
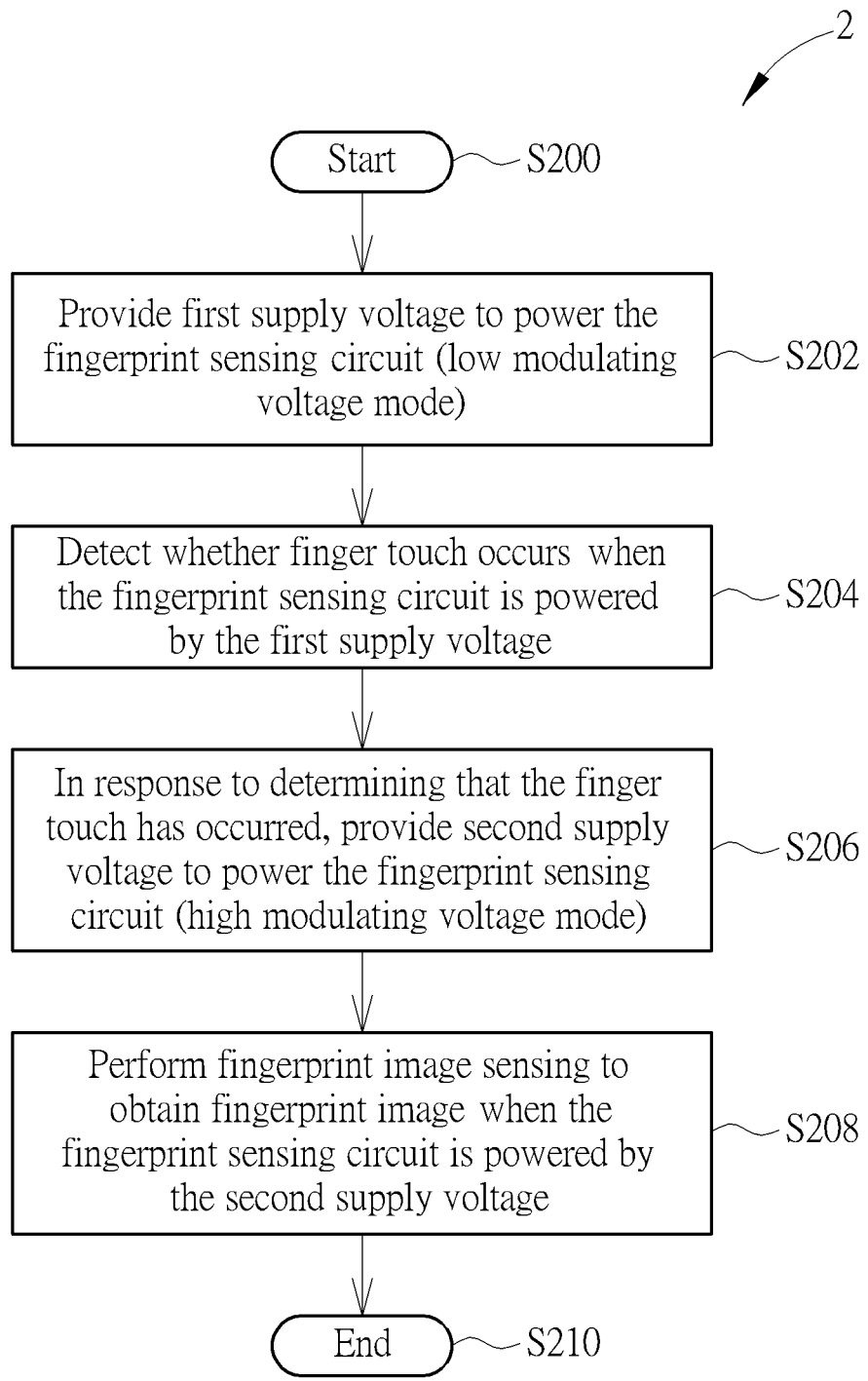
FIG. 2 is a flow diagram of a procedure according to an embodiment of the present invention.

FIG. 2 is a flow diagram of a procedure 2 according to an embodiment of the present invention. The procedure 2 can be applied to the fingerprint sensing device 1 shown in FIG. 1. The procedure 2 includes the following steps:

Step S200: Start.

Step S202: Provide a first supply voltage to power the fingerprint sensing circuit (low modulating voltage mode).

Step S204: Detect whether a finger touch occurs when the fingerprint sensing circuit is powered by the first supply voltage.

Step S206: In response to determining that the finger touch has occurred, provide a second supply voltage to power the fingerprint sensing circuit (high modulating voltage mode).

Step S208: Perform fingerprint image sensing to obtain a fingerprint image when the fingerprint sensing circuit is powered by the second supply voltage.

Step S210: End.

According to the procedure 2, in Step S202, during operation, the fingerprint sensing device 1 enters a low modulating voltage mode (or called a power saving mode) for detecting whether a finger touch occurs at first. The controller 106 generates a first control signal CTRL1 to the first voltage conversion circuit 20 and controls the first voltage conversion circuit 20 to provide the supply voltage P1. The first voltage conversion circuit 20 generates the supply voltage P1 to power the fingerprint sensing circuit 102 in response to the first control signal CTRL1.

Figure 3:
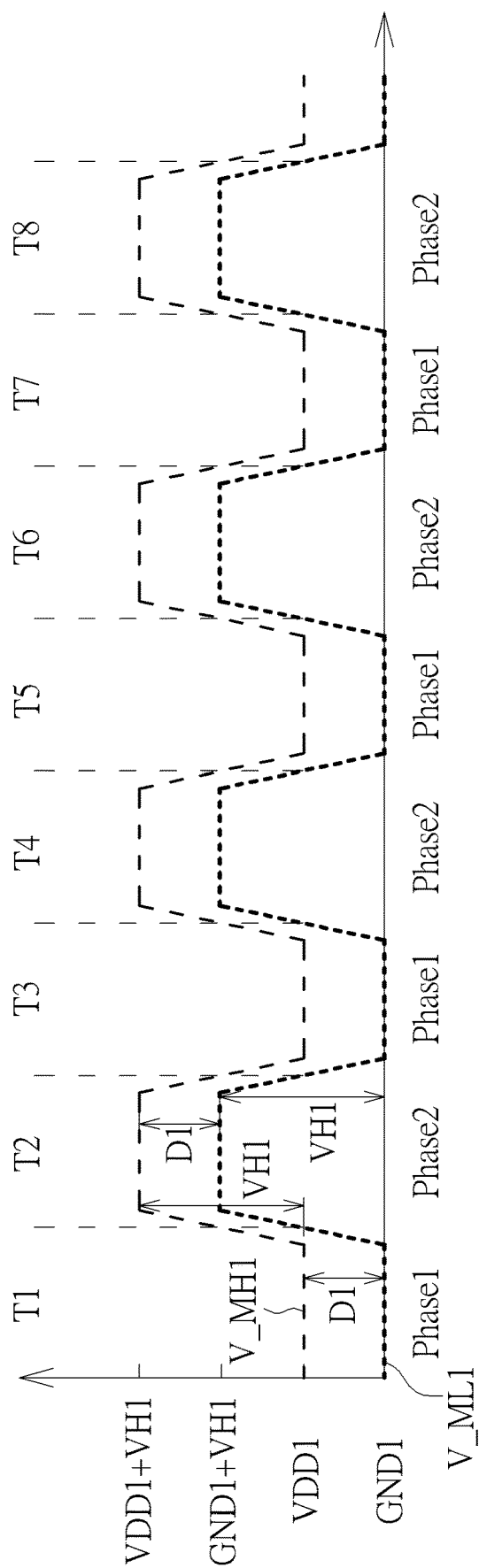
FIG. 3 is a waveform diagram illustrating the waveform of the supply voltage generated by the first voltage conversion circuit according to an embodiment of the present invention.

Please refer to FIG. 3, which is a waveform diagram illustrating the waveform of the supply voltage P1 generated by the first voltage conversion circuit 20 according to an embodiment of the present invention. As shown in FIG. 1 and FIG. 3, the supply voltage P1 includes a modulating voltage V_MH1 and a modulating voltage V_ML1. For example, each of the modulating voltage V_MH1 and the modulating voltage V_ML1 may be a pulse signal having a state change of two phases (e.g., phase 1 and phase 2). In phase 1 (e.g., at periods T1, T3, T5), the voltage level of the modulating voltage V_MH1 is VDD1 and the voltage level of the modulating voltage V_ML1 is GND1. In phase 2 (e.g., at periods T2, T4, T6), the voltage level of the modulating voltage V_MH1 is VDD1+VH1 and the voltage level of the modulating voltage V_ML1 is GND1+VH1.

The modulating voltage V_MH1 is greater than the modulating voltage V_ML1. In an embodiment, as shown in FIG. 3, there is the same voltage difference between the modulating voltage V_MH1 and the modulating voltage V_ML1. During the period T1 (phase 1), the voltage difference between the modulating voltage V_MH1 and the modulating voltage V_ML1 is D1 (D1=VDD1−GND1). For example, the voltage difference D1 is 2V. During the period T2 (phase 2), the voltage difference between the modulating voltage V_MH1 and the modulating voltage V_ML1 is D1 (D1=(VDD1+VH1)−(GND1+VH1)). During the period T3 (phase 1), the voltage difference between the modulating voltage V_MH1 and the modulating voltage V_ML1 is also D1. That is, the voltage difference between the modulating voltage V_MH1 and the modulating voltage V_ML1 remains the same. The voltage difference between the modulating voltage V_MH1 and the modulating voltage V_ML1 maintains a constant value.

Figure 4:
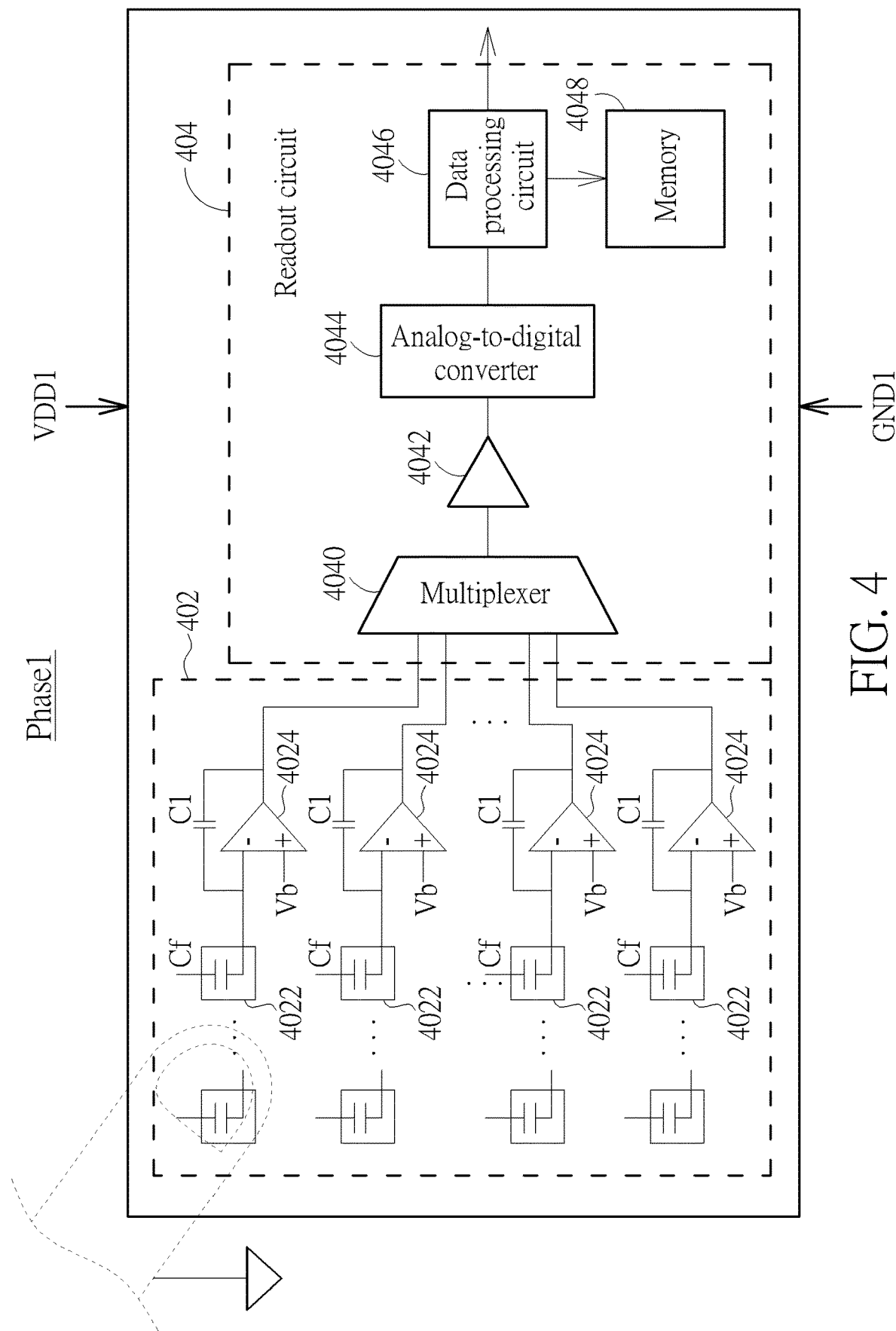
FIG. 4 and FIG. 5 are schematic diagrams of the fingerprint sensing circuit when powered by the first supply voltage shown in FIG. 3 according to embodiments of the present invention.

In Step S204, the fingerprint sensing circuit 102 performs the sensing process and outputs corresponding sensing values to the finger touch detection circuit 104 when powered by the supply voltage P1 (low modulating voltage mode). The finger touch detection circuit 104 determines whether a finger touch occurs according to the sensing values measured by the fingerprint sensing circuit 102. Please refer to FIG. 4 and FIG. 5, which are schematic diagrams of the fingerprint sensing circuit 102 when powered by the supply voltage P1 according to an embodiment of the present invention. As shown in FIG. 4, the fingerprint sensing circuit 102 includes, but is not limited to, a sensor array 402 and a readout circuit 404. The sensor array 402 includes a plurality of sensor elements 4022 and amplifiers 4024. The sensor elements 4022 may be sensing pixel electrode. The sensor elements 4022 may be arranged in rows and columns. For each amplifier 4024, a negative input end of the amplifier 4024 is coupled to a corresponding sensor element 4022, and a positive input end of the amplifier 4024 is coupled to a reference voltage Vb. Each amplifier 4024 including a feedback capacitor C1 connected between the negative input end and an output end of the amplifier 4024. The amplifier 4024 converts the charge carried by the sensor element 4022 to a sensing signal outputted to the readout circuit 404.

The readout circuit 404 includes a multiplexer 4040, an amplifier 4042, an analog-to-digital converter 4044, a data processing circuit 4046 and a memory 4048. The multiplexer 4040 is utilized to select a sensor element 4022 of the sensor array 402 for measuring the sensing signals (e.g., capacitance values) of the selected sensor element. The amplifier 4042 amplifies the output of the multiplexer 4042. The analog-to-digital converter 4044 converts the output of the amplifier 4042 to a digital value representing the sensing value (e.g., capacitance value) coupling between the user's finger and the sensor element 4022.

Figure 5:
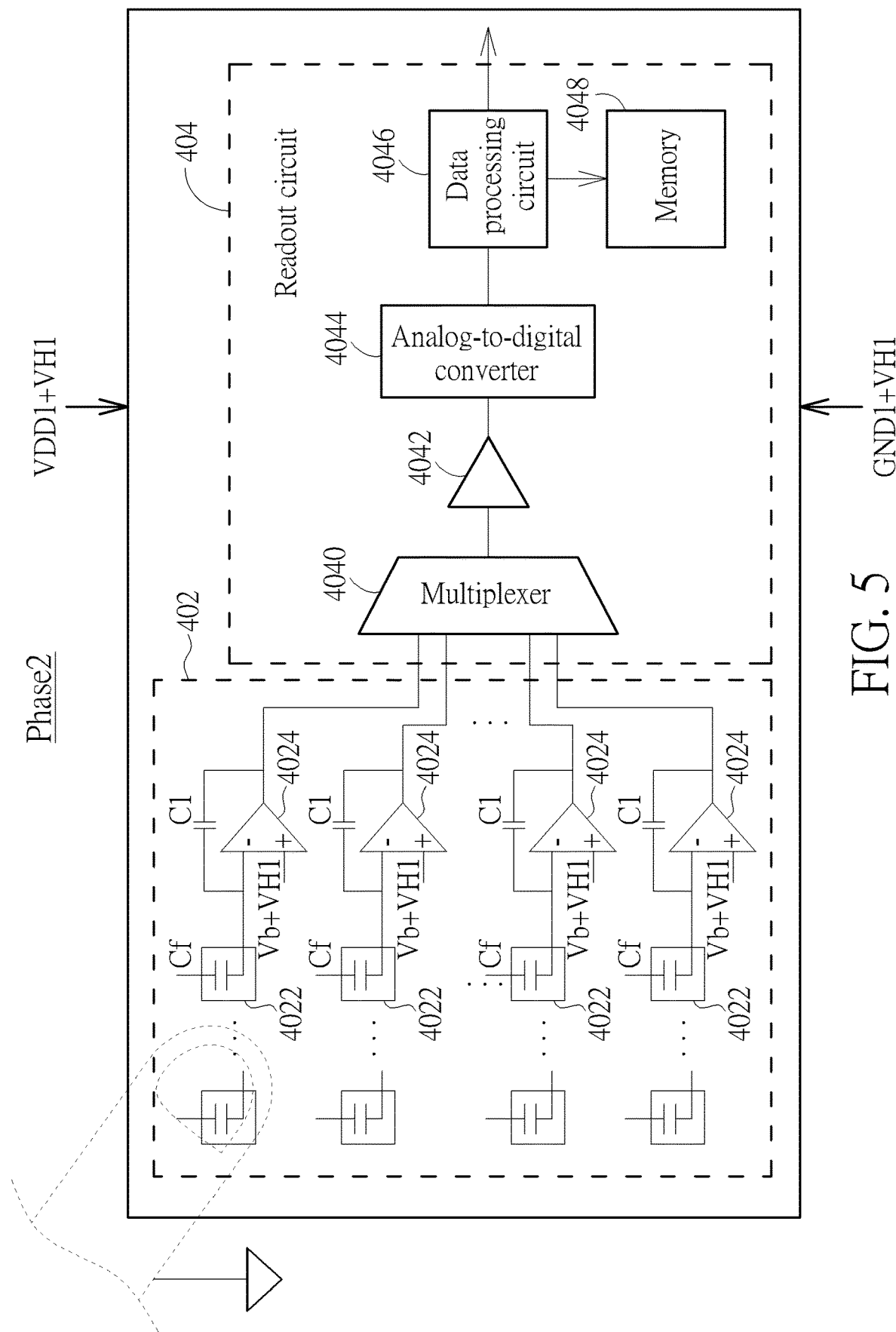

The fingerprint sensing circuit 102 is powered by the supply voltage P1 including the modulating voltage V_MH1 and the modulating voltage V_ML1. In phase 1 (e.g., at periods T1, T3, T5 shown in FIG. 0.3), as shown in FIG. 4, the voltage level of the modulating voltage V_MH1 is VDD1 and the voltage level of the modulating voltage V_ML1 is GND1. For each amplifier 4024, the feedback capacitor C1 is reset and there is no voltage across the feedback capacitor C1. That is, the voltage across the feedback capacitor C1 is reset to zero. In phase 2 (e.g., at periods T2, T4, T6 shown in FIG. 0.3), as shown in FIG. 5, the voltage level of the modulating voltage V_MH1 is VDD1+VH1 and the voltage level of the modulating voltage V_ML1 is GND1+VH1. The voltage level of the modulating voltage V_MH1 is raised from VDD1 to VDD1+VH1. The voltage level of the modulating voltage V_ML1 is raised from GND1 to GND1+VH1. The voltage level of the positive input end of the amplifier 4024 is raised to Vb+VH1. The output of the amplifier 4024 may increase by VH1*Cf/C1, wherein Cf is a finger capacitance value corresponding to the sensor element coupled to the amplifier 4024. As the user's finger approaches the sense array, the sensing values (e.g., a finger capacitance value Cf) at the sense array may increases. The output of the amplifier 4024 is provided to the multiplexer 4040. After processing by the amplifier 4042 and the analog-to-digital converter 4044, the sensing values can be provided to the data processing circuit 4046. The data processing circuit 4046 transmits the sensing values to the finger touch detection circuit 104.

The finger touch detection circuit 104 determines whether a finger touch occurs on the fingerprint sensing circuit 102 according the sensing values. For example, the finger touch detection circuit 104 may include a comparator and a determination circuit. The comparator is configured to compare the sensing values measured by the fingerprint sensing circuit 102 when powered by the first supply voltage P1 with a threshold. For example, the determination circuit generates a determination signal indicating that the finger touch occurs when at least one sensing values measured by the fingerprint sensing circuit 102 is greater than the threshold. The determination circuit generates a determination signal indicating that no finger touch occurs when no sensing values measured by the fingerprint sensing circuit 102 is greater than the threshold.

In Step S206, when the finger touch detection circuit 104 detects there is a finger touch occurring on the fingerprint sensing circuit 102, the fingerprint sensing device 1 enters a high modulating voltage mode (or called a normal operation mode). The controller 106 generates the first control signal CTRL1 to the first voltage conversion circuit 20 and controls the first voltage conversion circuit 20 to stop providing the supply voltage. The first voltage conversion circuit 20 stops generating the supply voltage P1 in response. Further, the controller 106 generates a second control signal CTRL2 to the second voltage conversion circuit 20 and controls the second voltage conversion circuit 30 to provide the supply voltage P2. The second voltage conversion circuit 30 generates the supply voltage P2 to power the fingerprint sensing circuit 102 in response to the second control signal CTRL2.

Figure 6:
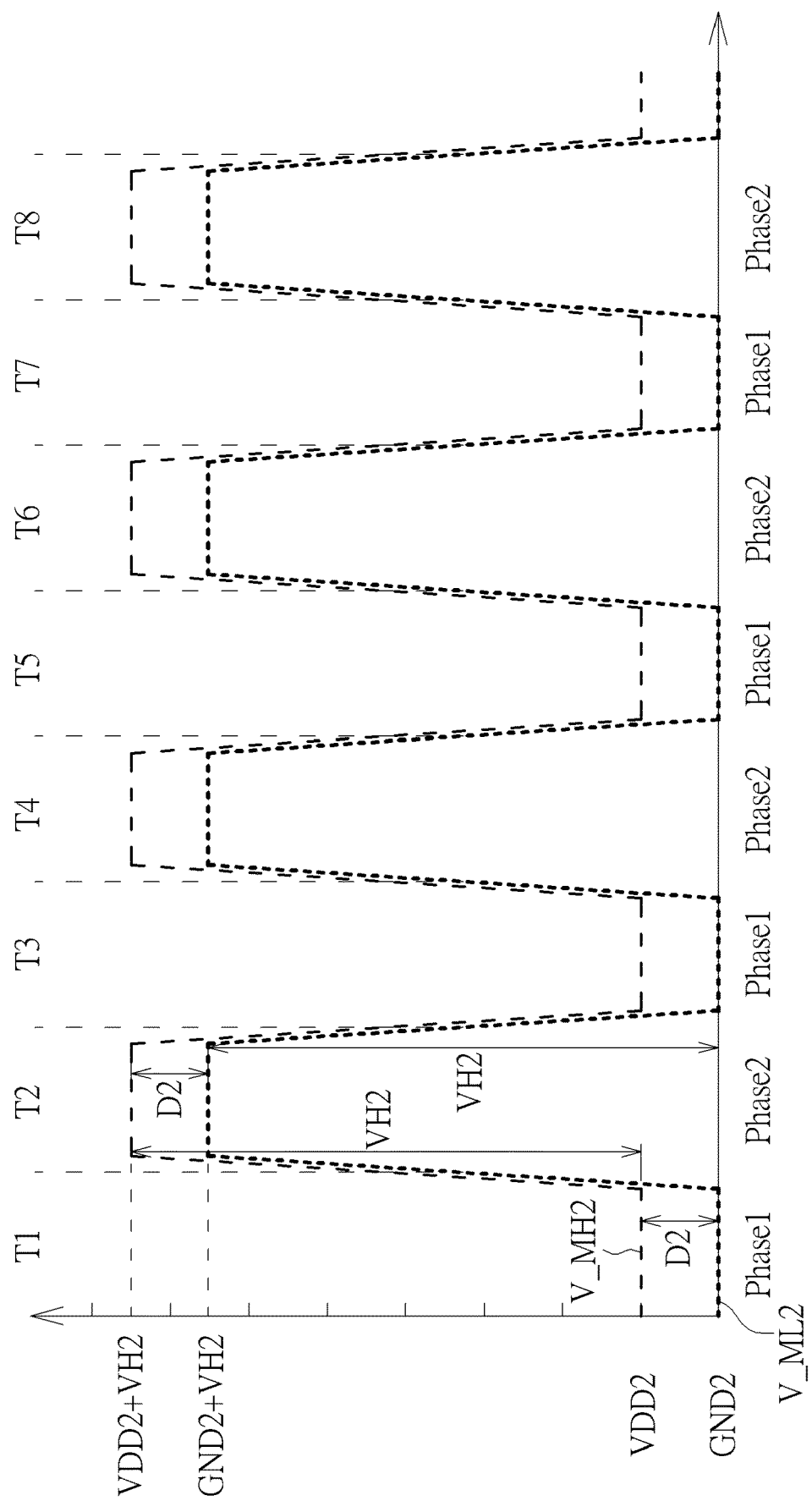
FIG. 6 is a waveform diagram illustrating the waveform of the supply voltage generated by the second voltage conversion circuit according to an embodiment of the present invention.

Please refer to FIG. 6, which is a waveform diagram illustrating the waveform of the supply voltage P2 generated by the second voltage conversion circuit 30 according to an embodiment of the present invention. As shown in FIG. 1 and FIG. 6, the supply voltage P2 includes a modulating voltage V_MH2 and a modulating voltage V_ML2. For example, each of the modulating voltage V_MH2 and the modulating voltage V_ML2 may be a pulse signal having a state change of two phases (e.g., phase 1 and phase 2). In phase 1 (e.g., at periods T1, T3, T5) shown in FIG. 6, the voltage level of the modulating voltage V_MH2 is VDD2 and the voltage level of the modulating voltage V_ML2 is GND2. In phase 2 (e.g., at periods T2, T4, T6) shown in FIG. 6, the voltage level of the modulating voltage V_MH2 is VDD2+VH2 and the voltage level of the modulating voltage V_ML2 is GND2+VH2.

The modulating voltage V_MH2 is greater than the modulating voltage V_ML2. In an embodiment, there is the same voltage difference between the modulating voltage V_MH2 and the modulating voltage V_ML2. As shown in FIG. 6, during the period T1, the voltage difference between the modulating voltage V_MH2 and the modulating voltage V_ML2 is D2 (e.g., the voltage difference D2 is 2V). During the period T2, the voltage difference between the modulating voltage V_MH2 and the modulating voltage V_ML2 is also D2. Such like this, the voltage difference between the modulating voltage V_MH2 and the modulating voltage V_ML2 remains the same. The voltage difference between the modulating voltage V_MH2 and the modulating voltage V_ML2 maintains a constant value.

Please further refer to FIG. 3 and FIG. 6. A difference between a voltage level of the modulating voltage V_MH1 in the period T1 shown in FIG. 3 and a voltage level of the modulating voltage V_MH1 in the period T2 shown in FIG. 3 is VH1 (VH1=VDD1−GND1). A difference between a voltage level of the modulating voltage V_MH2 in the period T1 shown in FIG. 6 and a voltage level of the modulating voltage V_MH2 in the period T2 shown in FIG. 6 is VH2 (VH2=VDD2−GND2). The difference VH1 is smaller than difference VH2 (i.e., VH1<VH2). That is, the voltage variation of the modulating voltage V_MH2 applied in the high modulating voltage mode (i.e. Steps 206 and 208) is larger than the voltage variation of the modulating voltage V_MH1 applied in the low modulating voltage mode (i.e. Steps 202 and 204). For example, VDD1 is 3V, GND1 is 0V and VH1 is 3V. In phase 1 shown in FIG. 3, the voltage level of the modulating voltage V_MH1 is 3V and the voltage level of the modulating voltage V_ML1 is 0V. In phase 2 shown in FIG. 3, the voltage level of the modulating voltage V_MH1 is 6V (3V+3V=6V) and the voltage level of the modulating voltage V_ML1 is 3V (0V+3V=3V). For example, VDD2 is 3V, GND2 is 0V and VH2 is 12V. In phase 1 shown in FIG. 6, the voltage level of the modulating voltage V_MH2 is 3V and the voltage level of the modulating voltage V_ML2 is 0V. In phase 2 shown in FIG. 6, the voltage level of the modulating voltage V_MH2 is 15V (3V+12V=15V) and the voltage level of the modulating voltage V_ML2 is 12V (0V+12V=12V).

Further, a difference between a voltage level of the modulating voltage V_ML1 in the period T1 shown in FIG. 3 and a voltage level of the modulating voltage V_ML1 in the period T2 shown in FIG. 3 is VH1 since the voltage difference between the modulating voltage V_MH1 and the modulating voltage V_ML1 remains the same. A difference between a voltage level of the modulating voltage V_ML2 in the period T1 shown in FIG. 6 and a voltage level of the modulating voltage V_ML2 in the period T2 shown in FIG. 6 is also VH2 since the voltage difference between the modulating voltage V_MH2 and the modulating voltage V_ML2 remains the same.

Figure 7:
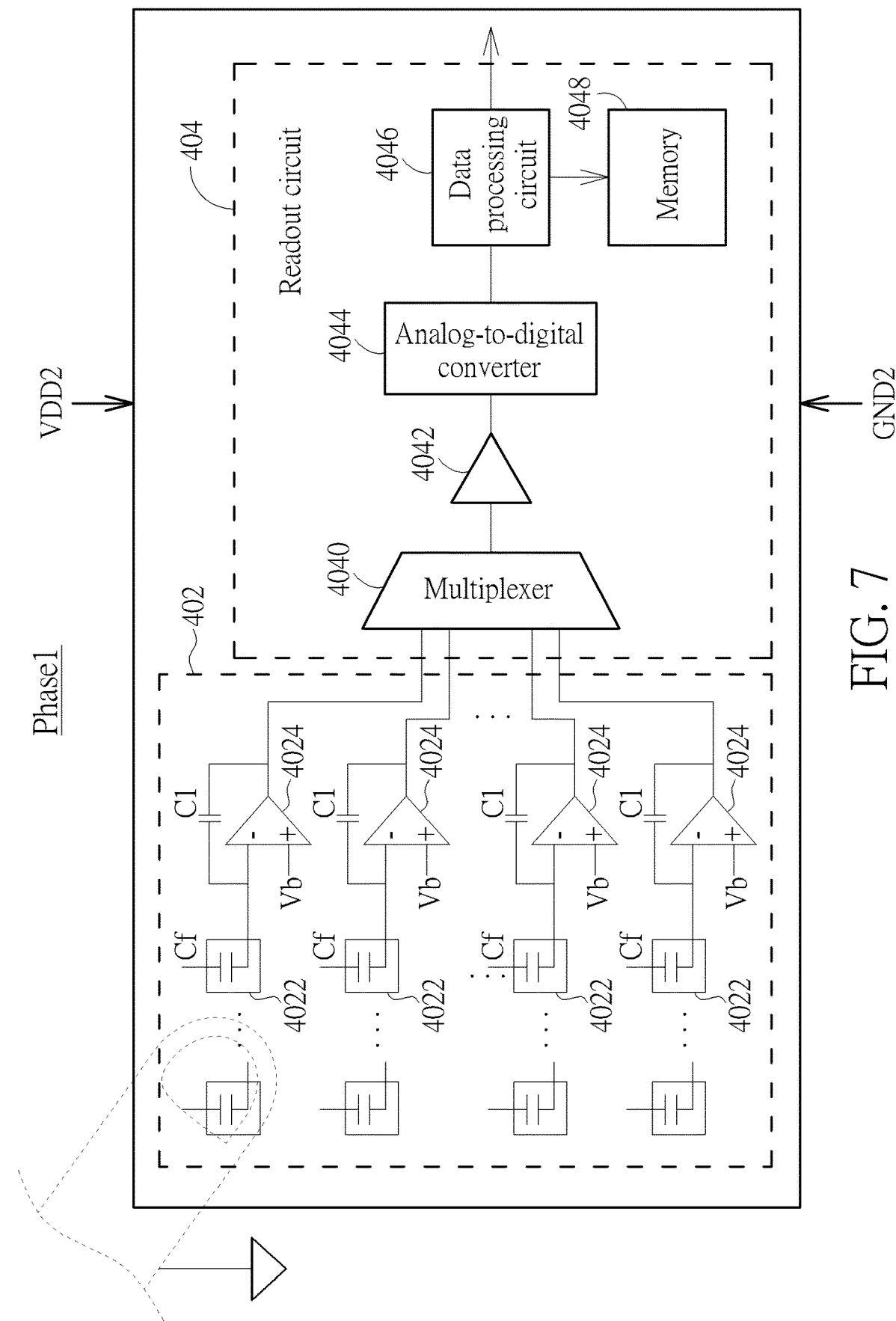
FIG. 7 and FIG. 8 are schematic diagrams of the fingerprint sensing circuit when powered by the second supply voltage shown in FIG. 6 according to embodiments of the present invention.
Figure 8:
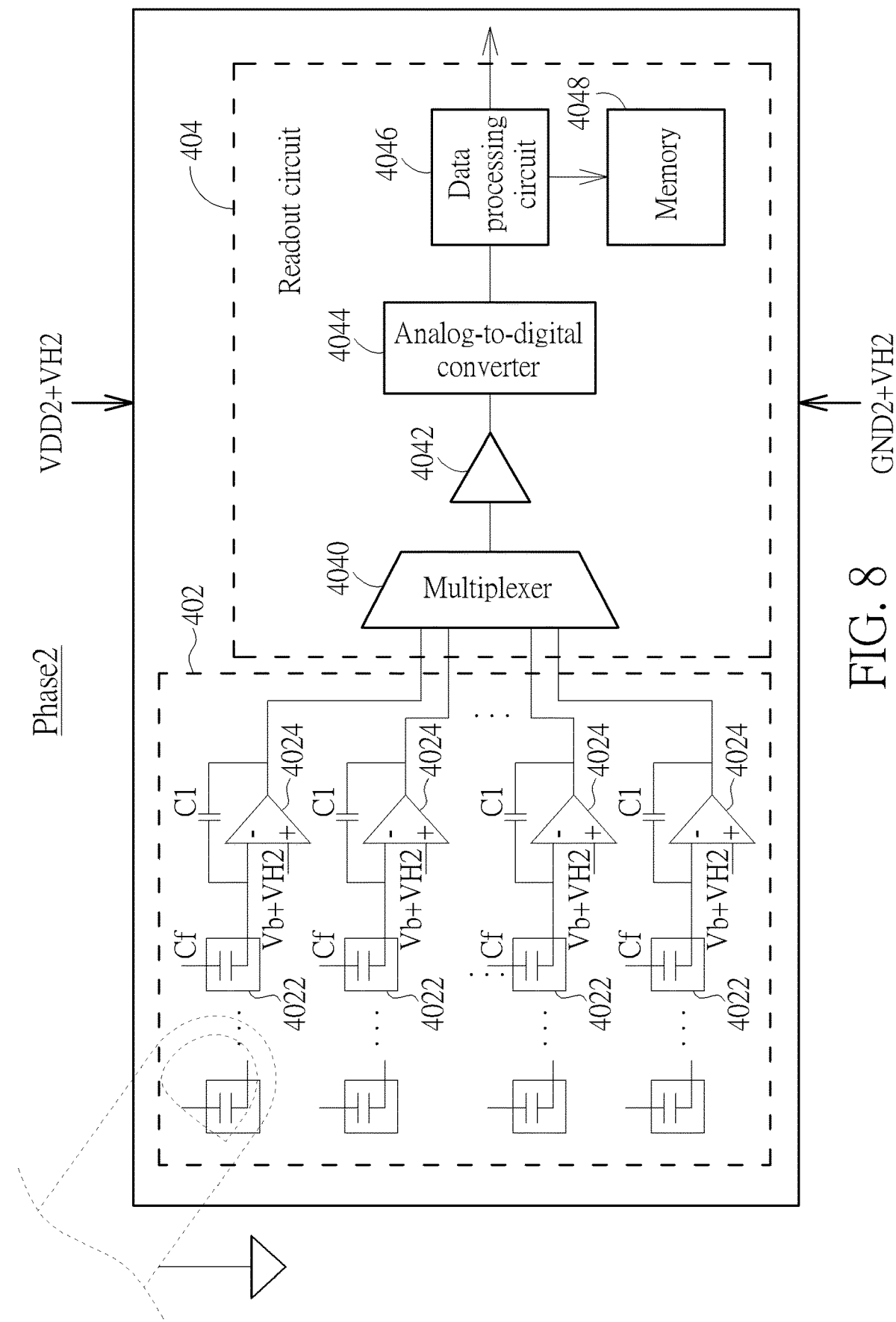

In Step S208, the fingerprint sensing circuit 102 performs the sensing process (fingerprint image sensing) and outputs corresponding sensing values to obtain a fingerprint image when powered by the supply voltage P2 (high modulating voltage mode). Please refer to FIG. 7 and FIG. 8, which are schematic diagrams of the fingerprint sensing circuit 102 when powered by the supply voltage P2 according to an embodiment of the present invention. The fingerprint sensing circuit 102 is powered by the supply voltage P2 including the modulating voltage V_MH2 and the modulating voltage V_ML2. In phase 1 (e.g., at periods T1, T3, T5 shown in FIG. 6), as shown in FIG. 7, the voltage level of the modulating voltage V_MH2 is VDD2 and the voltage level of the modulating voltage V_ML2 is GND2. For each amplifier 4024, the feedback capacitor C1 is reset and there is no voltage across the feedback capacitor C1. In phase 2 (e.g., at periods T2, T4, T6 shown in FIG. 6), as shown in FIG. 8, the voltage level of the modulating voltage V_MH2 is VDD2+VH2 and the voltage level of the modulating voltage V_ML2 is GND2+VH2. The voltage level of the modulating voltage V_MH2 is raised from VDD2 to VDD2+VH2. The voltage level of the modulating voltage V_ML2 is raised from GND2 to GND2+VH2. The voltage level of the positive input end of the amplifier 4024 is raised to Vb+VH2. The output of the amplifier 4024 may increase by VH2*Cf/C1 and Cf is a finger capacitance value corresponding to the sensor element coupled to the amplifier 4024. Similarly, the output of the amplifier 4024 is provided to the multiplexer 4040. After processing by the amplifier 4042 and the analog-to-digital converter 4044, the sensing values can be provided to the data processing circuit 4046. The data processing circuit 4046 receives the digital sensing values from the analog-to-digital converter 4044 and processes the digital sensing values to generate a fingerprint image. The fingerprint image may reflect different features, such as ridges and valleys of a fingerprint. The fingerprint image can be stored into the memory 4048.

Note that, those skilled in the art should readily make combinations, modifications and/or alterations on the abovementioned description and examples. The abovementioned steps of the procedures including suggested steps can be realized by means that could be hardware, firmware, or computer instructions or programs stored in a non-transitory computer readable medium. Examples of hardware can include analog circuits, digital circuits and mixed circuits.

Figure 9:
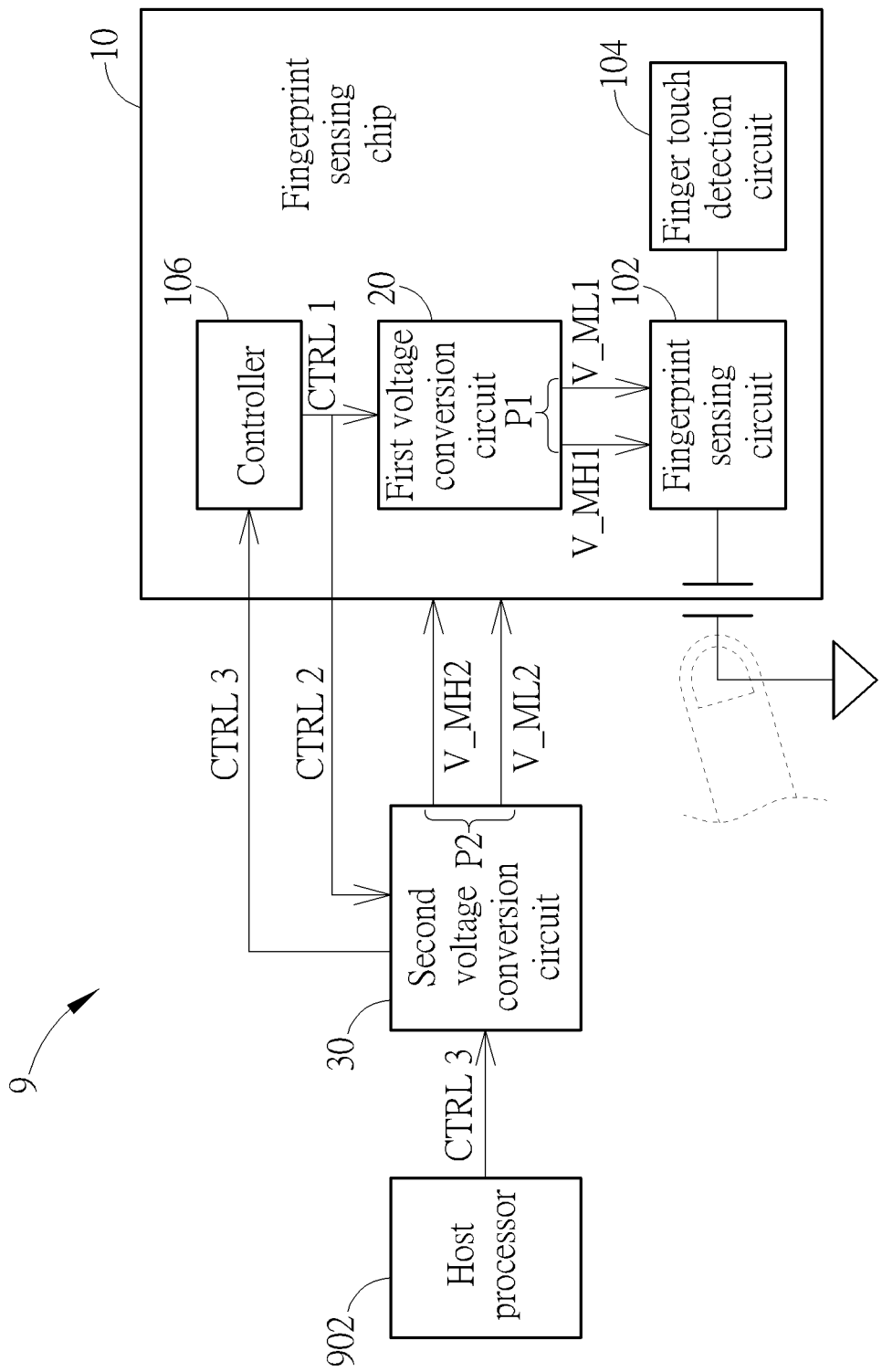
FIG. 9 is a schematic diagram of a fingerprint sensing device according to an alternative embodiment of the present invention.

Please refer to FIG. 9, which is a schematic diagram of a fingerprint sensing device 9 according to an embodiment of the present invention. Please note that the units in the fingerprint sensing device 9 shown in FIG. 9 with the same designations as those in the fingerprint sensing device 1 shown in FIG. 1 have similar operations and functions, and further description thereof is omitted for brevity. The interconnections of the units are as shown in FIG. 9. Compared to FIG. 1, the fingerprint sensing device 9 of the FIG. 9 further includes a host processor 902. Suppose that the first voltage conversion circuit 20 may be a charge pump installed in the fingerprint sensing chip 10. The second voltage conversion circuit 30 may be a boost converter outside the fingerprint sensing chip 10. During operation of the fingerprint sensing device 9, the host processor 902 may generate a third control signal CTRL3 and transmits the third control signal CTRL3 to the controller 106 via the second voltage conversion circuit 30 so as to control the controller 106 to generate the first control signal CTRL1 and the second control signal CTRL2 for arranging operations of the first voltage conversion circuit 20 and the second voltage conversion circuit 30.

In summary, embodiments of the present invention provides the supply voltage P1 to power the fingerprint sensing circuit 102 in the low modulating voltage mode and provides the supply voltage P2 having larger modulating voltage variation than the supply voltage P1 to power the fingerprint sensing circuit 102 in the high modulating voltage mode for fingerprint image sensing, thus enhancing system performance and reducing power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fingerprint sensing method, for a fingerprint sensing device, comprising:
providing a first supply voltage to power a fingerprint sensing circuit of the fingerprint sensing device;
detecting whether a finger touch occurs when the fingerprint sensing circuit is powered by the first supply voltage;
in response to determining that the finger touch has occurred, providing a second supply voltage to power the fingerprint sensing circuit; and
performing fingerprint image sensing to obtain a fingerprint image when the fingerprint sensing circuit is powered by the second supply voltage;
wherein a difference between a voltage level of the first supply voltage in a first period and a voltage level of the first supply voltage in a second period is smaller than a difference between a voltage level of the second supply voltage in a third period and a voltage level of the second supply voltage in a fourth period, wherein the second period is adjacent to the first period, and the fourth period is adjacent to the third period.

2. The fingerprint sensing method of claim 1, wherein the first supply voltage includes a first modulating voltage and a second modulating voltage, the first modulating voltage is greater than the second modulating voltage, the second supply voltage includes a third modulating voltage and a fourth modulating voltage, and the third modulating voltage is greater than the fourth modulating voltage.

3. The fingerprint sensing method of claim 2, wherein a difference between a voltage level of the first modulating voltage in the first period and a voltage level of the first modulating voltage in the second period is smaller than a difference between a voltage level of the third modulating voltage in the third period and a voltage level of the third modulating voltage in the fourth period.

4. The fingerprint sensing method of claim 2, wherein a difference between a voltage level of the first modulating voltage in the first period and a voltage level of the first modulating voltage in the second period is smaller than a difference between a voltage level of the fourth modulating voltage in the third period and a voltage level of the fourth modulating voltage in the fourth period.

5. The fingerprint sensing method of claim 2, wherein a difference between a voltage level of the second modulating voltage in the first period and a voltage level of the second modulating voltage in the second period is smaller than a difference between a voltage level of the third modulating voltage in the third period and a voltage level of the third modulating voltage in the fourth period.

6. The fingerprint sensing method of claim 2, wherein a difference between a voltage level of the second modulating voltage in the first period and a voltage level of the second modulating voltage in the second period is smaller than a difference between a voltage level of the fourth modulating voltage in the third period and a voltage level of the fourth modulating voltage in the fourth period.

7. The fingerprint sensing method of claim 2, wherein a voltage difference between the first modulating voltage and the second modulating voltage maintains a constant value.

8. The fingerprint sensing method of claim 2, wherein a voltage difference between the third modulating voltage and the fourth modulating voltage maintains a constant value.

9. The fingerprint sensing method of claim 1, wherein the step of detecting whether a finger touch occurs when the fingerprint sensing circuit is powered by the first supply voltage comprises:
comparing sensing values measured by the fingerprint sensing circuit powered by the first supply voltage with a threshold; and determining that the finger touch occurs when at least one sensing values measured by the fingerprint sensing circuit is greater than the threshold.

10. A fingerprint sensing device, comprising:
a first voltage conversion circuit for generating a first supply voltage; and
a second voltage conversion circuit for generating a second supply voltage;
a fingerprint sensing circuit;
a finger touch detection circuit coupled to the fingerprint sensing circuit for determining whether a finger touch occurs according to sensing values measured by the fingerprint sensing circuit powered by the first supply voltage;
wherein when the finger touch detection circuit determines that the finger touch occurs, the second voltage conversion circuit generates the second supply voltage to power the fingerprint sensing circuit and the fingerprint sensing circuit performs fingerprint image sensing to obtain a fingerprint image, wherein a difference between a voltage level of the first supply voltage in a first period and a voltage level of the first supply voltage in a second period is smaller than a difference between a voltage level of the second supply voltage in a third period and a voltage level of the second supply voltage in a fourth period, wherein the second period is adjacent to the first period, and the fourth period is adjacent to the third period.

11. The fingerprint sensing device of claim 10, wherein the first supply voltage includes a first modulating voltage and a second modulating voltage, the first modulating voltage is greater than the second modulating voltage, the second supply voltage includes a third modulating voltage and a fourth modulating voltage, and the third modulating voltage is greater than the fourth modulating voltage.

12. The fingerprint sensing device of claim 11, wherein a difference between a voltage level of the first modulating voltage in the first period and a voltage level of the first modulating voltage in the second period is smaller than a difference between a voltage level of the third modulating voltage in the third period and a voltage level of the third modulating voltage in the fourth period.

13. The fingerprint sensing device of claim 11, wherein a difference between a voltage level of the first modulating voltage in the first period and a voltage level of the first modulating voltage in the second period is smaller than a difference between a voltage level of the fourth modulating voltage in the third period and a voltage level of the fourth modulating voltage in the fourth period.

14. The fingerprint sensing device of claim 11, wherein a difference between a voltage level of the second modulating voltage in the first period and a voltage level of the second modulating voltage in the second period is smaller than a difference between a voltage level of the third modulating voltage in the third period and a voltage level of the third modulating voltage in the fourth period.

15. The fingerprint sensing device of claim 11, wherein a difference between a voltage level of the second modulating voltage in the first period and a voltage level of the second modulating voltage in the second period is smaller than a difference between a voltage level of the fourth modulating voltage in the third period and a voltage level of the fourth modulating voltage in the fourth period.

16. The fingerprint sensing device of claim 11, wherein a voltage difference between the first modulating voltage and the second modulating voltage maintains a constant value.

17. The fingerprint sensing device of claim 11, wherein a voltage difference between the third modulating voltage and the fourth modulating voltage maintains a constant value.

18. The fingerprint sensing device of claim 10, wherein the finger touch detection circuit compares the sensing values measured by the fingerprint sensing circuit powered by the first supply voltage with a threshold and determines that the finger touch occurs when at least one sensing values measured by the fingerprint sensing circuit is greater than the threshold.

* * * * *